Patented Sept. 30, 1930

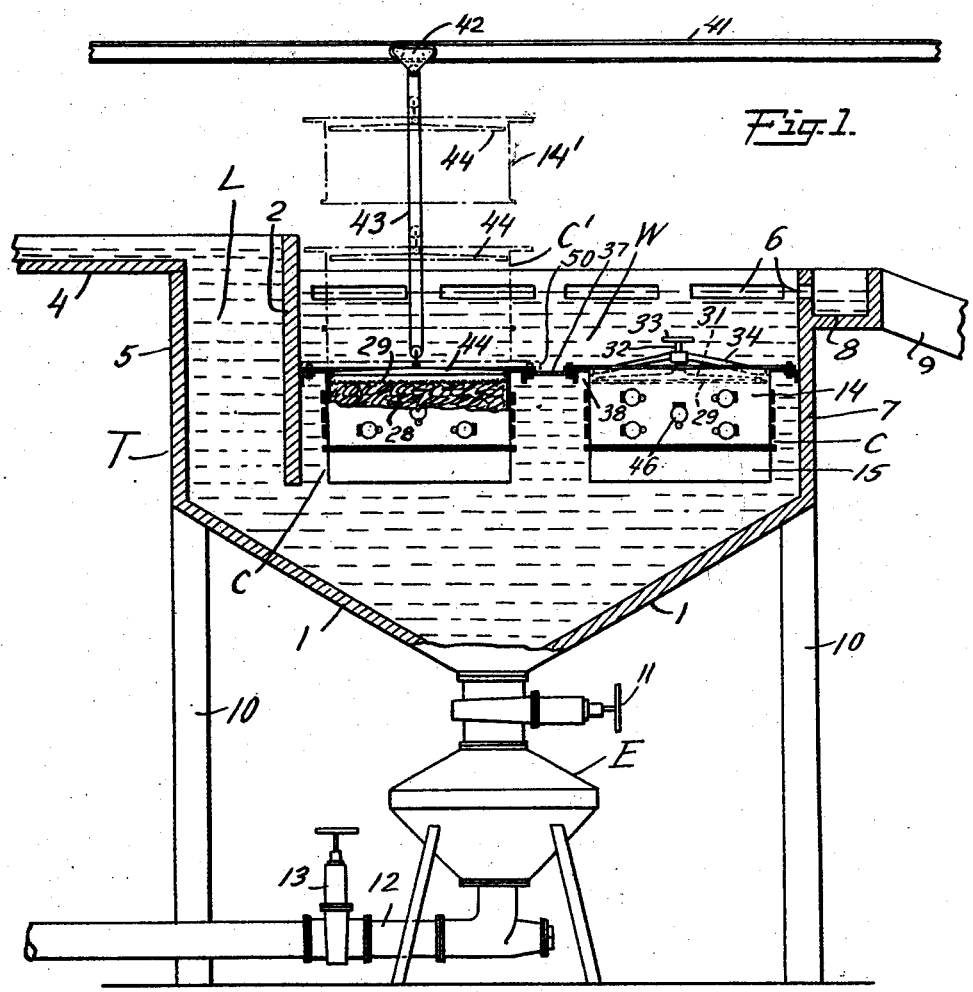

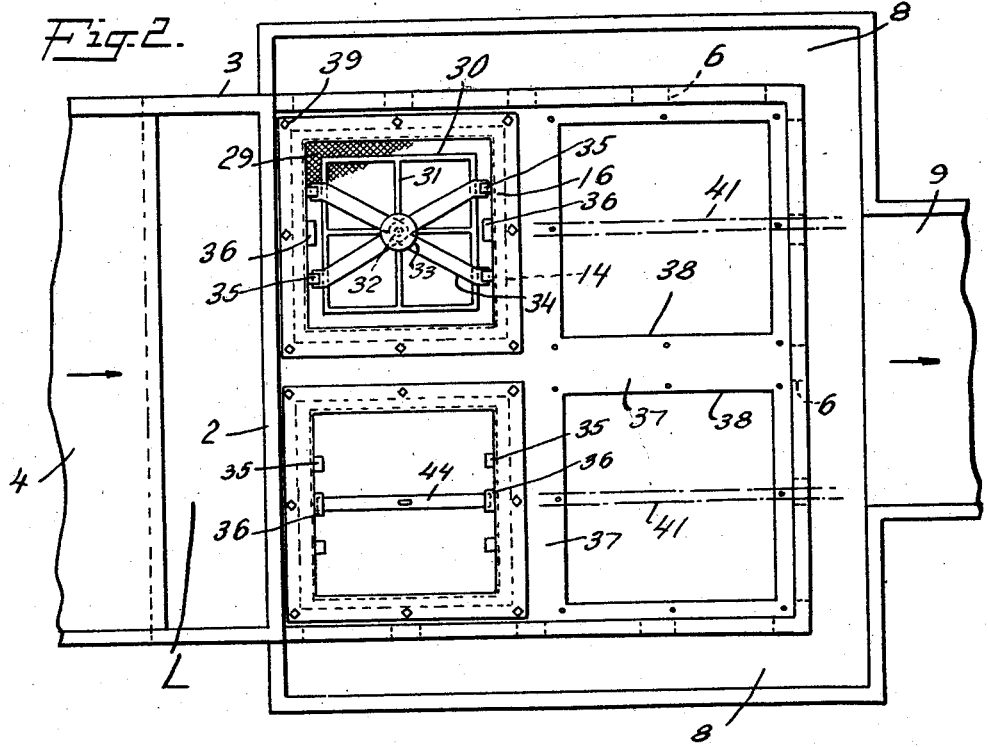
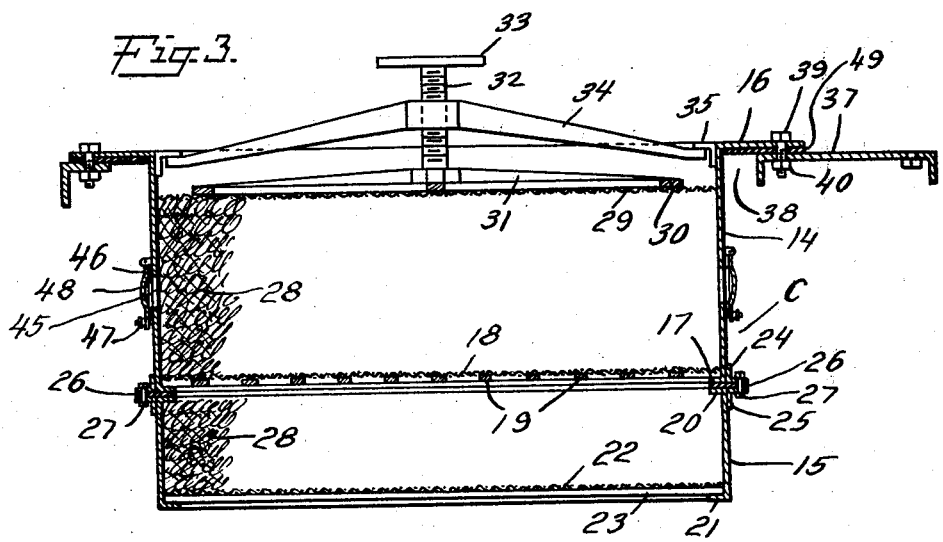

1,776,883

UNITED STATES PATENT OFFICE

CHARLES T. CABRERA, OF NEW YORK, N. Y., ASSIGNOR TO ELECTRO DIALYZER CORPORATION, OF NEW YORK, N. Y., A CORPORATION OF NEW YORK

FILTRATION PROCESS AND APPARATUS

Application filed June 1, 1928. Serial No. 282,216.

This invention relates to the filtration of solid laden liquids, and more particularly concerns filtration apparatus for clarifying various liquids in large quantities.

Many solid laden liquids, such as sewage and the waste liquids from pulp and textile mills or canning or other industrial plants must be subjected to various forms of treatment for the removal of soluble and insoluble solids therefrom. It is often desirable or essential, particularly in the treatment of sewage, that very large quantities of the solid laden liquid be continuously filtered, and it is further desirable that substantially all of the soluble or colloidal solids as well as insoluble solids be removed during the filtering process. The clarification treatments ordinarily employed include filtration through mesh screens, filter cloths, felted fabrics or beds of sand and earth. These treatments have proven unsatisfactory for various reasons. If mesh screens or fabric filters are employed, the soluble or colloidal solids are not removed to a sufficient extent, and due to the fixed nature of the interstices of this type of filtering medium, the insoluble solids quickly clog the filter and thus cause an undesirable reduction in the rate of flow of the solid laden liquid therethrough. Filter beds of sand or earth clog quickly, occupy considerable space and are open to further serious objection in that the flow of liquid therethrough separates the constituent particles thereof and thereby reduces the filtering action. Further, the cleaning of filter beds of granular material is a difficult and expensive operation.

In accordance with the invention set forth in my copending application Serial No. 233,497, filed November 15, 1927, of which this application is a continuation in part, an improved filtering medium is provided which overcomes the above described and other difficulties encountered in the use of known types of filters. This improved filtering medium comprises generally a mass of intimately associated and closely compacted metallic strands or filaments. In the use of a filtering medium of this type, it has been found desirable to provide special means for supporting the filtering medium, conducting the solid laden liquid therethrough, removing the filtered solids and cleaning the filtered beds.

It is an object of the present invention to provide improved filtration apparatus in which filtering mediums of metallic wool and various other materials may be advantageously employed. More specifically, it is proposed in accordance with the present invention to provide filtering apparatus of the gravity type embodying novel removable containers for supporting the filtering medium, these containers incorporating convenient means for cleansing and replacing the filtering medium without handling the medium in unconfined form. The invention further contemplates the provision of improved means for maintaining the filtering medium at the required density within the containers, means for supporting the containers and means for confining the flow of solid laden liquid to the filtering medium proper.

Various other specific objects, advantages and characteristic features of the present invention will be pointed out or will become apparent as the description thereof progresses.

In describing the invention in detail, reference will be made to the accompanying drawing, in which;

Figure 1 is a sectional side view of a filtering device constructed in accordance with the present invention;

Fig. 2 is a plan view of the device with certain parts thereof removed; and

Fig. 3 is an enlarged sectional side view of one of the filter bed containers of the present invention, together with the supporting means therefor.

The filtration apparatus shown in the drawings and described herein comprises one particular form of means incorporating the features of the present invention, but it should be understood that the invention is not limited in its scope to the particular embodiment disclosed, but is applicable to a great variety of variously constructed filtration devices.

The filtering device shown comprises generally a tank or vat T, preferably of square or rectangular shape, and having a downwardly tapered bottom wall 1. A vertical partition 2 is fixed across the tank T near one end thereof, extending between the side walls 3 and spaced from the bottom wall 1 as shown. The partition 2 divides the tank into an inlet passage L and a filter well or passageway W. A suitable inlet trough or open conduit 4 is fixed to the upper edge of the tank T at one end thereof in communication with the upper end of the inlet passage L. This trough preferably extends across the entire end of the tank T, as shown in Fig. 2. A plurality of elongated outlet openings or slots 6 are provided near the upper edges of the side walls 3 and the end wall 7 of the tank T around the filter well W thereof as shown in Fig. 1, and a gutter 8 is fixed to the outer surfaces of the tank walls under the openings 6 for the reception of the filtered liquid therefrom. A chute 9 is provided in communication with the gutter 8 for carrying away the filtered liquid.

The tank T as well as the partition 2, the trough 4 and the gutters 8 may be formed of wood, metal or any other suitable material, the materials employed being preferably uneffected by the liquids to be treated. The tank T may be supported in any suitable manner, as for example, by the corner posts or columns 10.

The lower apex of the bottom wall 1 of the tank T is connected through a cut-off valve 11 to an ejector E of suitable construction. The ejector is provided with an outlet pipe 12 having a cut-off valve 13 therein. The particular construction of ejector used forms no part of the present invention and therefore will not be described herein, it being sufficient to understand that this device operates, with the aid of compressed air or otherwise, to carry the accumulated sludge or sediment away from the bottom of the tank T.

Referring now more particularly to the construction of the filter bed container and the supporting means therefor, which comprise important features of the present invention, the filtering medium, which in the illustrated embodiment comprises metallic wool, is retained within one or more open-ended containers C which are supported within the filtering well W of the tank T as shown in Fig. 1. Each container C comprises generally an open-ended rectangular or square shell composed of two interconnected and separable sections 14 and 15. The upper section 14 is preferably of substantially greater depth than the lower section 15 and is provided with a wide continuous flange 16 extending outwardly at right angles to the walls thereof at their upper edges as shown in Fig. 3. A continuous inwardly extending flange 17 is provided around the lower edges of the walls of the container section 14, the flanges 16 and 17 being preferably formed as integral parts of the section. A wire mesh screen or other suitable permeable partition 18 is supported across the lower open end of the section 14, being carried on and reinforced by a plurality of cross bars 19 of metal or other suitable material, the ends of the bars 19 being supported by the inturned flange 17.

The lower section 15 of the container C is provided with continuous inwardly extending flanges 20 and 21 at the upper and lower edges thereof respectively, these flanges being preferably integral with the walls of the section. A screen or permeable partition 22, similar to the screen 18 of the upper section, is supported across the lower open end of the lower section 15 by a plurality of bars 23 resting on the lower inturned flange 21 as shown.

The two sections 14 and 15 are preferably interconnected by suitable means providing a liquid-tight seal. In the embodiment shown, suitable angle brackets or angle irons 24 are secured to the outer surfaces of the walls of the upper section 14 at their lower edges, and corresponding brackets 25 are similarly fixed to the walls of the lower section 15 at their upper edges. A gasket 26 of rubber or other suitable resilient and impervious material is inserted between the flanges 17 and 20 of the sections 14 and 15 respectively, and the sections are clamped together by means of bolts 27 or other suitable fastening means engaging the brackets 24 and 25.

The filtering medium employed is packed within the container sections 14 and 15. This medium preferably comprises metallic wool of the type described in my copending application Serial No. 233,497, filed November 15, 1927, and Serial No. 282,217, filed June 1, 1928. In general, it is preferred to employ a wool formed of a plurality of intermixed and intimately associated strands of physically and potentially dissimilar metals such as lead and zinc for this purpose, but it should be understood that the invention is not limited to the use of any specific filtering medium. When metallic strands or filaments are employed as the filtering medium, it is preferred that the metals used be so chosen that the intermixed wool is resilient to a certain degree and also has sufficient mass and body to withstand the rapid flow of solid laden liquid therethrough without undue displacement or separation.

The filtering medium 28 is packed within the lower section 15 of each container C against the screen 22 therein, being compacted to the required density by means of suitable pressing apparatus or by the use of hammer blows, if necessary. A quantity of the filtering medium 28 is similarly packed within the upper section 14 on the screen 18 thereof. The filtering medium in the upper section 14 of each container C is preferably maintained at the required density by a suitable retaining press which is shown in detail in Fig. 3. A screen or other permeable partition 29 is placed over the filtering medium 28, and a rectangular frame 30 having cross members 31 is placed over this screen. A suitable screw 32 having an operating wheel 33 fixed to the upper end thereof is journaled in an opening at the center of the frame 30, and threadedly engages an opening in a cross brace 34. The brace 34 is preferably formed with a plurality of radially extending arms which are retained beneath a plurality of inwardly extending angle brackets 35, suitably secured to the upper edges of the walls of the section 14. By advancing the screw 32 through the brace 34, the frame 30 and the screen 29 are pressed down upon the filtering medium 28, which is thereby pressed to and maintained at the desired density. When it is desired to remove the filtering medium 28 from the container section 14, the screw 32 is retracted and the brace 34 is turned through a small angle about the screw as an axis thereby moving the arms of the brace from under the brackets 35 and permitting the withdrawal of the brace 34, the frame 30 and the screen 29 from the upper open end of the container section 14.

A pair of oppositely disposed inwardly extending angle brackets 36 are preferably provided at the upper edge of the container sections 14 for use in lifting the container C or the upper section thereof out of the tank T, as hereinafter more fully explained.

Each of the containers C is preferably provided with a plurality of spaced cleaning openings 45 in the side walls of the upper section 14 thereof. These openings are normally closed by suitable means such as the covers 46, which may be hinged to the container walls and held in their closed positions by suitable clamps 47. Resilient gaskets 48 are preferably employed in connection with the covers 46 to insure a liquid-tight closure.

The containers C are preferably removably secured within the filtering well W of the tank T in such a manner that the solid laden liquid is forced to flow upwardly therethrough. In the embodiment shown, the container support comprises a plurality of interconnected or integral horizontal plates or ledges extending across the filtering well W at a point below the normal liquid level therein as shown. These supporting plates preferably take the form of a single metallic frame 37 having a plurality of rectangular openings 38 for the reception of the container C. As shown in Figs. 2 and 3, the openings 38 are larger than the containers C but smaller than the outside dimensions of the outwardly extending flanges 16 at the upper edges of the containers. The containers C are lowered through the openings 38 and supported by the engagement of the flanges 16 with the frame 37. A liquid-tight joint between the flanges 16 and frame 37 is obtained by the use of suitable resilient gasket 49 and the flanges 16 are preferably clamped to the frame 37 by suitable bolts 39 and nuts 40. The nuts 40 are preferably welded or otherwise suitably secured to the lower surface of the frame 37 to prevent their loss and to facilitate the removal and replacement of the bolts 39. The frame 37 may be provided with any suitable number of openings, the number so chosen being dependent upon the size of the individual containers C and the rate of flow of liquid to be handled.

One or more conveyor brackets or beams 41 are provided above the tank T, each of these brackets being disposed to pass directly over the center of one or more of the containers C. A suitable support 42 is movably mounted on the bracket 41 by rollers or other means, and one end of a lifting tackle 43 of any known type is secured to this support. A cross bar 44 is secured at its midpoint to the lower end of the lifting tackle 43, this bar being of a suitable length to pass within the containers C and engage the lower faces of the oppositely disposed brackets 36 of the containers. It will be apparent that by moving the support 42 to a position directly above the center of a container and engaging the bar 44 beneath the brackets 36 the container may be lifted out of the container T, and transported to any desired point.

The operation of the filtration apparatus of the present invention will now be described. The filter bed containers C are filled with metallic wool or any other suitable filtering medium, the lower sections 15 of the containers being packed to the required density and clamped to the upper sections 14, and the material in the upper sections being pressed to the required density by the screws 32 and the frames 30. The containers C are then bolted into the openings 38 in the frame 37 of the filter well W and the apparatus is then ready for use.

The solid laden liquid is introduced to the inlet chamber L through the trough or conduit 4 and this liquid flows downwardly under the lower edges of the partition 2 and then upwardly into the well W and through the several filter bed containers C. Because of the liquid-tight joints between the container sections and between the upper edges of the containers and the frame 37, all of the liquid is forced to travel through the filter beds within the containers. When the solid laden liquid is first introduced to the tank T, the valve 13 is closed and the valve 11 is opened, and the insoluble solids as well as the soluble or colloidal solids filtered from the liquid vehicle by the filter beds settle to the lower apex of the tank T and fill the ejector E. After the sludge thus filtered from the liquid has reached a level considerably above the lower apex of the tank T, the valve 11 is closed, the valve 13 is opened, and the ejector is operated to remove the sludge therefrom through the pipe 12. Since the sludge is permitted to build up to a considerable depth within the tank T before the ejector E is operated, the sludge within the ejector is compressed to a considerable extent by the weight of the column of sludge within the tank, and a considerable quantity of liquid is thereby extracted from each charge of sludge before it leaves the ejector. The ejecting operation is repeated at suitable intervals as the filtration process continues.

The wide and shallow nature of the inlet trough 4 permits the introduction of the solid laden liquid to the tank T at a comparatively high rate without unduly agitating or stirring the liquid within the tank. This feature is of considerable importance in connection with the building up of a column of sludge at the bottom of the tank just prior to each operation of the ejector E as explained above.

The hydraulic head required to force the solid laden liquid through the filter beds is maintained by the liquid column in the inlet passage L, it being readily apparent from the disclosure of Fig. 1 that this liquid column is considerably higher than the normal liquid level within the filter well W. The filtered liquid rises from the filter beds and flows out of the filter well through the opening or slots 6 near the upper edges of the side walls thereof, this liquid being caught in the gutters 8 and conducted away through the trough or chute 9. If desired, the filtered liquid may be further clarified by passing it through a second filtering device substantially identical with the filtering device described. When this further filtration of the liquid is required, the outlet trough 9 of the tank T is arranged to communicate directly with the inlet trough of another tank, not shown, and the liquid is treated in such second tank in the manner described above.

During the filtration process, a certain amount of sludge and sediment collects in the filtering medium within the containers C and it is therefore desirable to periodically clean the filter beds. With the apparatus of the present invention, the lower portion of each filter bed is supported in a separable section 15 of the container C, which section may be removed and cleaned without cleaning the entire depth of the bed.

When it is desired to clean or replace the lower portion of the filter beds, each container C is separately subjected to the following operation. The bolts 39 are removed from the flange 16 of the container, the screw 32 is loosened and the brace 34 is removed from the upper end of the upper container section 14. The lifting bar 44 is then engaged beneath the brackets 36 of the container, and the entire container is lifted from the frame 37 to a position substantially as indicated by broken lines at C' in Fig. 1. A plurality of bars or supports, indicated by broken lines at 50, are then placed across the opening 38 from which the container has been withdrawn, and the container is supported by these bars while the bolts 27 are removed therefrom to disconnect the upper section 14 from the lower section 15 of the container. The upper section 14 is then lifted to a position generally indicated by broken lines at 14', and the lower section 15 may then be removed and cleaned by passing hot water, steam or dilute acid therethrough. It is usually preferred to keep a plurality of extra lower sections 15 clean and ready for use, so that one of these clean sections may be immediately connected to the upper section and the complete container C returned to its operating position in a minimum time. The clean lower section 15 is placed on the supporting bars 50, the upper section 14 is lowered into engagement with the lower section and the two sections are bolted together as described above to form a complete container C. The container is then lifted a few inches, the bars 50 are removed and the container is lowered into place and clamped to the frame 37 as described above. The brace 34 and screw 32 are then replaced within the upper end of the upper section 14, and the filtering medium is compressed to the desired density, after which the apparatus is in condition for use.

After extended periods of continuous use, it is desirable to cleanse the upper portions of the filter beds supported within the upper container sections 14. This is conveniently accomplished by separately removing each container C and disconnecting the lower section 15 thereof in the manner described above. Each upper section 14 is then transferred by the moving of support 42, running on the track 41, to some convenient point, and is placed within a washing tray or other suitable liquid receptacle, not shown. The covers 46 are then removed from the openings 45 in the side walls of the section. Streams or jets of hot water, steam, dilute acid or any other suitable cleaning fluid are directed into the filtering medium 28 by means of pipes or hoses inserted through the openings 45. Due to the fact that the openings 45 are distributed over various portions of the container section walls, and lie at different levels in the section, the entire mass of filtering material may be readily loosened up and washed clean in this manner. After being thoroughly cleansed, each upper section 14 is returned to the tank T, secured to a clean lower section 15 and replaced in the frame 37 as explained above.

It is entirely feasible, and sometimes desirable, to employ an extra set of upper container sections 14 as well as lower sections 15 and to clean each set of upper sections while the other set is in use. This procedure is advantageous in that it reduces the time during which the filtering apparatus must be shut down. It should be understood that in most commercial filtration plants, at least two complete filtering devices of the type described will be employed, and the filter beds of these devices will preferably be alternately cleaned or replaced. In this manner the continuous treatment of the solid laden liquid is insured.

The advantages of the filtering apparatus of the present invention are readily apparent. Due to the construction and arrangement of the filtering medium containers and the supporting means therefor, all of the solid laden liquid is forced to flow through the filter beds. The capacity of the filtration apparatus may be varied by increasing or decreasing the number of filtering containers employed, the unoccupied openings in the frame 37 being closed by suitable liquid-tight covers. The containers C comprise convenient means for handling and supporting the filtering medium, and since comparatively large quantities of this material are employed in filters of the present type, the manner in which the medium is supported, cleaned and replaced is of considerable importance. The filter bed containers include adjustable and removable means for compressing the filtering medium to the required density and maintaining the medium in this state throughout the operation of the device. Due to the simplicity of construction and the interchangeability of the filter bed containers, the cleaning and replacement of the filtering medium may be accomplished with a minimum expenditure of time and labor.

I claim:

1. In a device for filtering solid laden liquids, a passageway, means for directing a stream of liquid through said passageway, at least one open ended container removably secured across said passageway in the path of said liquid stream, and a mass of filtering material supported within said container, said container having a plurality of normally closed openings in the side walls thereof to permit the introduction of a cleaning fluid to said filtering material.

2. A filter bed comprising a container having open ends, a permeable partition secured across the lower end of said container, a mass of filtering material within said container supported by said partition, and means removably secured to the upper edge of said container for compressing said filtering material to the desired density, said container having a plurality of openings in the side walls thereof to permit the introduction of a cleaning fluid to said filtering material.

3. In a device for filtering solid laden liquids, a passageway, means for directing a stream of liquid through said passageway, a filter bed supported in said passageway comprising a plurality of open ended container sections detachably connected in end-to-end relation, a permeable partition secured across the lower open end of each of said sections, masses of filtering material supported on said partitions within said containers, and means detachably secured to the upper end of the uppermost container section for compressing said filtering material to the required density.

4. In a device for filtering solid laden liquids, a tank, a vertical filtering passageway in said tank, means for directing a stream of solid laden liquid upwardly through said passageway, a frame extending across said passageway having a plurality of openings therein, an open ended container removably secured in each of said openings, a mass of finely stranded metal in each of said containers, means removably secured to each of said containers for compressing said stranded metal to the desired density, each of said containers having a plurality of spaced openings in the side walls thereof for admitting cleaning fluid to the stranded metal therein, and means for closing said openings in the side walls of said containers.

5. A method of cleaning a filter bed which consists in removing the entire filter bed bodily from the filtering container, removing from the filter bed the layer of filtering material with which the liquid to be filtered first comes into contact, replacing said layer with a clean layer of filtering material and replacing the entire filter bed bodily in the filtering container.

In testimony whereof I affix my signature.

CHARLES T. CABRERA.